United States Patent [19]
Hofman et al.

[11] 3,851,527
[45] Dec. 3, 1974

[54] MAXIMUM TEMPERATURE MONITOR

[75] Inventors: Gerard L. Hofman, Downers Grove, Ill.; Gary D. Hudman, Idaho Falls, Idaho

[73] Assignee: The United States of America as represented by the United States Atomic Energy Commission, Washington, D.C.

[22] Filed: Jan. 21, 1974

[21] Appl. No.: 435,386

[52] U.S. Cl. .................................... 73/368, 73/358
[51] Int. Cl. ........................................... G01k 11/00
[58] Field of Search ........... 73/368, 358, 17 R, 17 A

[56] References Cited
UNITED STATES PATENTS
1,000,673 8/1911 Diack .................................. 73/358
2,046,863 7/1936 Allphin ............................... 73/358

Primary Examiner—James J. Gill
Assistant Examiner—Anthony V. Ciarlante
Attorney, Agent, or Firm—John A. Horan; Arthur A. Churm; Hugh W. Glenn

[57] ABSTRACT

A passive temperature monitor is presented with two evacuated chambers interconnected by a restricted passageway. One of the chambers is charged with a measured amount of vaporizable substance which has a relatively low vapor pressure at the charging temperature. On heating the monitor, for instance within a nuclear reactor coolant, the vapor pressure of the substance increases, thus increasing the portion of that substance in vapor phase throughout the two chambers. On cooling, the vaporized substance condenses, with a portion being trapped within the originally empty chamber. From the mass of that trapped portion, the maximum temperature occurrence can be determined.

12 Claims, 4 Drawing Figures

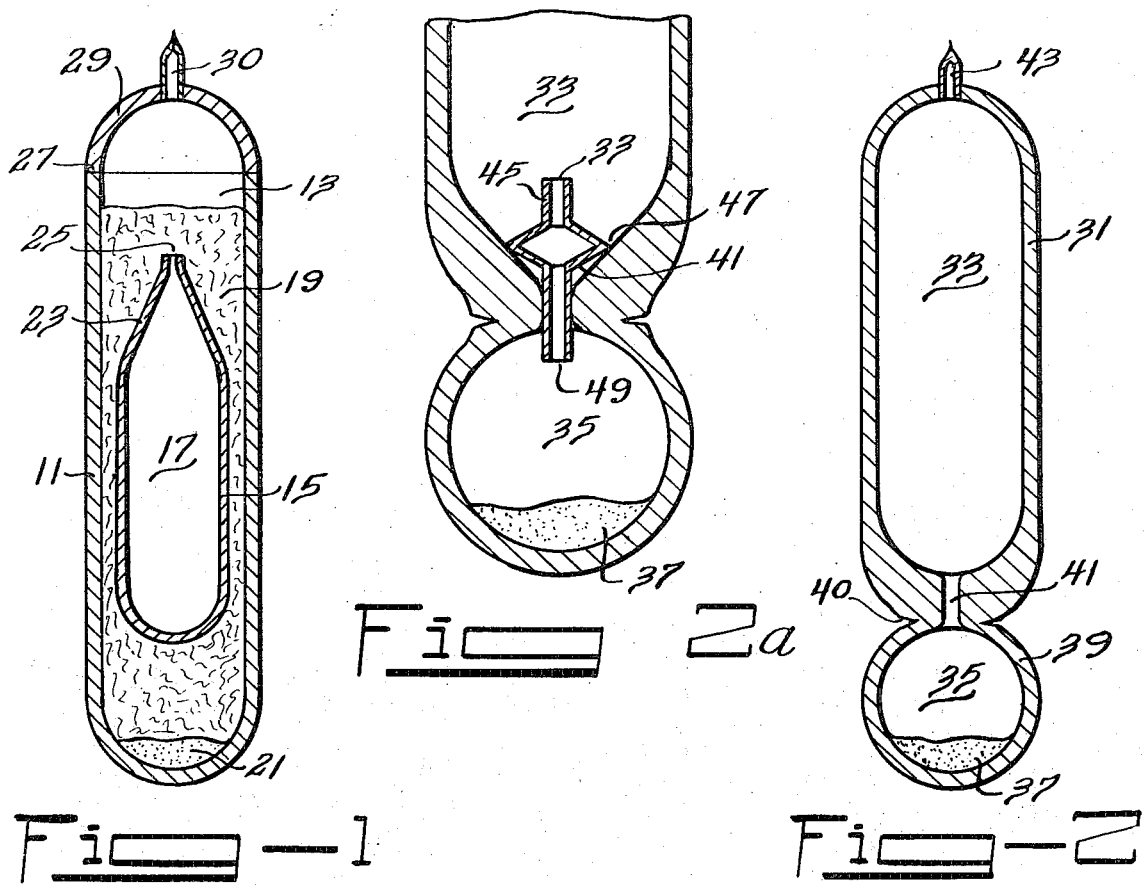
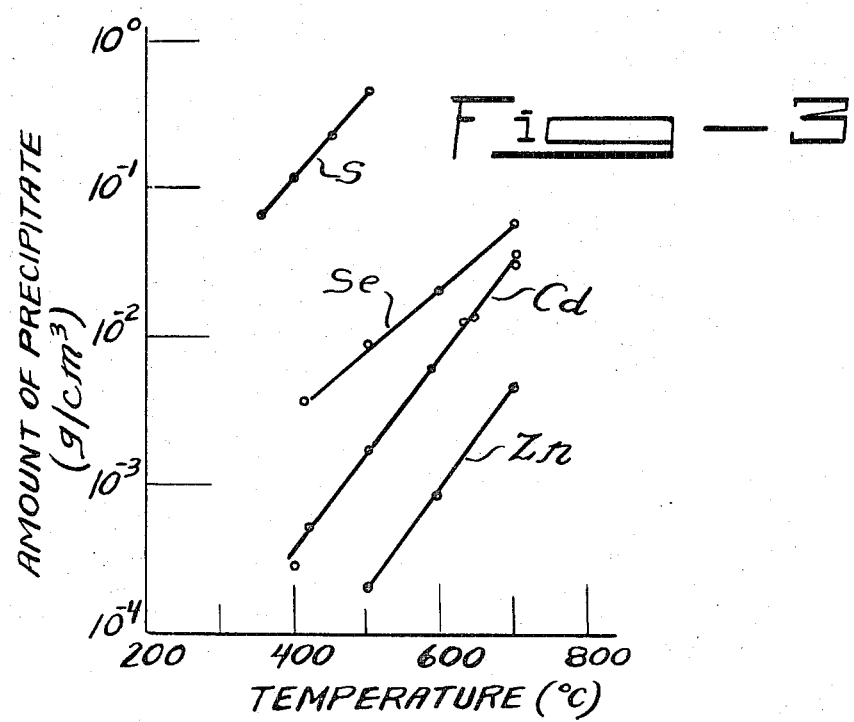

MAXIMUM TEMPERATURE MONITOR

CONTRACTUAL ORIGIN OF THE INVENTION

The invention described herein was made in the course of, or under, a contract with the UNITED STATES ATOMIC ENERGY COMMISION.

BACKGROUND OF THE INVENTION

The present invention relates to passive temperature monitors and particularly to those which are to be located at points where conventional thermocouples cannot be positioned. One important example of such an application lies in a nuclear reactor where high radiation fields and temperatures make it undesirable to penetrate the reactor containment.

Internal heating due to the interaction of ionizing radiation, particularly gamma radiation, is a recurrent problem with temperature monitors used in nuclear reactors. The gamma-heating effect can be calculated if the gamma-heating parameters of the construction materials as well as the gamma flux and gamma energy spectrum at the location of the monitor are known. In most cases, some additional measurements are required to obtain such information, thus complicating an otherwise straightforward temperature measurement.

Previous attempts to develop a passive temperature monitor for use internally within a nuclear reactor have until recently not produced a satisfactory device. For example, monitors employing a plurality of wires that melt at predetermined temperatures are only as precise as the temperature intervals between the melting points of the various wires. Another type monitor using dimensional and lattice changes in silicon carbide to determine temperature has generally given unreliable results due to phase transformations within the material and the difficulty in determining these changes.

Another, recently developed monitor has met with somewhat more acceptance. This monitor is called the thermal-expansion-difference monitor and, as its name implies, operates on the difference in thermal expansion of two materials. This expansion difference is preserved by the permanent distortion of a container material when the monitor is brought back to room temperature. A complete description of the thermal expansion difference monitor can be found in an article by Franklin and Ruther entitled "A Reactor In-Core Temperature Monitor," Transactions of American Nuclear Society, 14, 632, 1971.

After due consideration of these prior art devices and problems, the inventors have developed a passive temperature monitor that is as accurate and reliable as the thermal expansion difference monitor, but is somewhat easier to fabricate and calibrate. The present monitor design utilizes the vapor pressure of various volatilizable substances as a temperature-dependent variable. This relation is of an advantage for in-reactor use, since vapor pressure is insensitive to radiation. Vapor pressure depends strongly on temperature, thus affording high sensitivity to the present monitor. Further explanation of this dependency is given in a technical note by Gerard L. Hofman, Nuclear Technology, Vol. 19, pp. 204–6, Sept. 1973.

SUMMARY OF THE INVENTION

In view of the problems discussed above, it is therefore an object of the present invention to provide a passive monitor for determining maximum temperature in generally inaccessible locations.

It is also object to provide an easily fabricated passive temperature monitor that accurately records maximum temperature occurrence within a radiation field including substantial gamma flux.

It is a further object to provide a method for determining maximum temperature occurrence without use of electrical leads or tubing connections to the outside of the process.

In accordance with the present invention, an evacuated vessel is disclosed that includes first and second internal chambers interconnected by a restricted passageway. A source substance that is capable of exerting substantial vapor pressure at the range of temperatures to be recorded is disposed in the first of the two chambers. As the temperature of the monitor increases as a result of heat produced in the monitored process, the source substance exerts increased vapor pressure throughout both of the two chambers. When the monitor is removed from the process and cooled, the vaporized source substance condenses. After determining the amount of condensed substance within the second chamber and knowing the chamber's volume, the maximum vapor pressure and, correspondingly, the maximum temperature is determined.

DESCRIPTION OF THE DRAWINGS

The present invention is illustrated in the accompanying drawings wherein:

FIG. 1 is an elevation view in section of a maximum temperature monitor.

FIG. 2 is a sectional view of an alternate form of maximum temperature monitor.

FIG. 2a is a fragmentary sectional view showing a modification to the FIG. 2 monitor.

FIG. 3 is a typical calibration curve for various source substances relating the amount of precipitant to maximum temperature occurrence.

DETAILED DESCRIPTION OF THE INVENTION

Turning now to FIG. 1 where there is shown a temperature monitor including an outer vessel 11 that defines an internal chamber 13. A second vessel 15 is generally concentrically disposed within chamber 13 and defines a second chamber 17. Chamber 15 is supported and positioned by a loose fibrous packing material 19 such as shredded quartz or quartz wool material. At the bottom of chamber 13 is located a vapor source substance 21. Source substance 21 is selected to have a substantial vapor pressure at the maximum temperature to be measured. For instance, a vapor pressure in the range of $10^{-3}$ to 1 atmosphere would be considered adequate for this purpose.

The upper end of vessel 15 is tapered to form a cone or neck portion 23. This tapered portion 23 does not completely close the end of vessel 15 but rather leaves a restricted opening or passageway 25 of sufficient size to admit vapor from chamber 13. Both chambers 17 and 13 are evacuated of air prior to use through a port 30. The port is shown after being sealed to maintain vacuum.

In assembling the temperature monitor of FIG. 1, the upper portion or cap 29 of vessel 11 is initially removed. The source material 21 is initially dropped within the open vessel followed by positioning of a portion of fibrous material 19. Vessel 15 can then be put in place and the remainder of the fibrous material installed to maintain vessel 15 in position as shown. Cap 29 can then be welded or otherwise sealingly positioned in place along seam 27. Port 30 is initiallly opened and is connected to a vacuum source (not shown) to evacuate chambers 13 and 17. After a suitable absolute pressure of about $10^{-4}$ mm of mercury has been established, port 30 is sealed off, such as by a crimp welding or a glass tube fusion technique, to prevent loss of vacuum.

The materials used for fabricating the monitor can be any suitable inert materials that will not exert significant vapor pressures at the temperatures to be measured. Vitreous silica, that is, fused quartz, has been successfully used for both vessels and the fibrous packing material in the 300° to 800° C. range. Other suitable materials of construction include 304 or 316 stainless steels.

Vapor source substance 21 is a generally pure substance that has a suitably high vapor pressure at the temperature of interest. For example, a vapor pressure of about 1 to 10 mm of mercury will generally be adequate to produce a readable result in the present monitor. Sulfur, selenium, cadmium and zinc have been individually used at slightly different temperature intervals of the range indicated above. Various other materials such as mercury, cesium, rubidium, sodium and potassium might also be satisfactory at their own inherent temperature ranges.

Another aspect to consider in selecting vapor source material 21 is its volatility. A substance having a relatively low latent heat of sublimation or evaporation is desirable. For example, each of the elements listed above have heats of vaporization less than 30 Kg-Cal/gm-atom. In this respect sulfur and selenium are particularly suitable for use with heats of vaporization below 5 Kg-Cal/gm-atom. The monitor operates by the vaporization and subsequent recondensation of the source substance. Since vapor pressure is directly dependent on temperature, it is desirable that this process be carried out with small temperature gradients between the two vessels 11 and 15. Where relatively large quantities of heat must be transferred during the condensation process, large gradients may result. It will be apparent that large temperature differences between the chambers can cause reverse vapor transport and thus prevent the monitor from recording the maximum temperature occurrence.

Referring now to FIG. 2 where a single vessel is shown having an upper measuring chamber 33 and a lower source chamber 35. The chambers are interconnected by neck portion 39 that defines a restricted passageway 41. A notch 40 within neck 39 facilitates separation of the two chambers as is required to obtain readings from the monitor. The source substance 37 is located within the lower chamber 35. If substance 37 is provided in fine granular form, it can be introduced through port 43 at the top of the vessel 31. Otherwise, a method similar to that employed in conjunction with FIG. 1 can be used to introduce the source substance 37. Prior to use, the monitor is evacuated through port 43 which is then welded closed. When the monitor is exposed to an elevated temperature of interest, a portion of the source substance 37 will vaporize. On subsequent cooling, the vapor within chamber 33 will condense or precipitate on the walls of this chamber, the amount of which will be an indication of the difference between the maximum temperature and the reference temperature.

FIG. 2a illustrates one manner of preventing precipitated material within chamber 33 from falling back into source chamber 35. A short valve tube 45 having a plug portion 47 of increased diameter towards the center of its length is positioned within restricted passageway 41. The periphery of plug portion 47 communicates with the internal surfaces of chamber 33 to retain any precipitate that may flake from the upper chamber walls. Since tube 45 includes a central passageway 49, vapor from the source substance freely passes into chamber 33 without significant pressure drop.

In the operation of the monitor, it is evacuated as stated except for a relatively low vapor pressure of the source substance at, for instance, ambient temperature. When placed in direct contact with a nuclear reactor coolant stream at its outer surfaces, the source substance is heated to increase the vapor pressure throughout both of the chambers. When the monitor is removed from the reactor or other process and cooled to a reference temperature, the vapor pressure will drop to its value at that reference temperature by condensing source substance on the chamber walls. The amount of substance precipitated per unit volume of the second or measuring chamber is related to the difference between the maximum temperature occurring and the reference temperature through Clapeyron's equation:

$$m = PVM/RT - P_0V_0M/RT_0$$

where $m$ is a mass of condensed vapor in the measuring chamber.

V is volume of the measuring chamber, e.g. chamber 17 and 33 in FIGS. 1 and 2, respectively.

M is molecular weight of the source substance.

T is temperature.

R is the gas constant per mole.

P is the vapor pressure at temperature T.

Subscript O indicates values at reference conditions.

Although it is possible to obtain a maximum temperature reading from an uncalibrated monitor using the above equation and published vapor pressure data, it is advisable to calibrate each particular monitor design. A calibration curve for a particular source material over a temperature range of interest can be measured by determining the amount of precipitant in the measuring chambers of a series of monitors. The calibration curves may then be used for any future monitor that is loaded with the same source material. FIG. 3 presents calibration curves determined for sulfur, selenium, cadmium and zinc with the FIG. 2 monitor.

The amount of source substance precipitated within the measuring chamber can be determined by a number of methods. In each method, the measuring chamber is first severed or separated from the remainder of the monitor. In the FIG. 2 embodiment, this can be accomplished by severing vessel 31 at notch 40 within neck 39, while in the FIG. 1 embodiment cap 29 can be removed and the internally disposed vessel 15 removed. Where material is precipitated on the outside of the measuring vessel, it should first be cleaned off with an acid solution.

If the amount of precipitant is fairly large, as might be expected when a high vapor pressure material such as sulfur is employed, the measuring vessel can be weighed on a microbalance both with and without the precipitant to determine the precipitant mass. Where smaller amounts of precipitant are encountered, that is, in an order of magnitude of about $10^{-4}$ grams or less, the measuring vessel is fragmented and washed within a dilute acid solution. The wash solution is then examined by conventional atomic absorption techniques to determine the concentration of source substance within the solution. For the above-mentioned substances ultraviolet light at a characteristic frequency for each of the particular substances is projected through the solution. The amount of substance is determined from the decrease in power intensity of the light beam in a conventional manner.

In some applications, the monitor will be irradiated by neutrons while in use. Should characteristic radio-isotopes be produced, the amount of precipitant can be determined by the measured radiation level along with the specific activity of the expected source substance. Specific activity can be determined by counting a precisely weighed mass of source substance irradiated by the same neutron exposure as that received by the sample to be determined. Ordinarily the total mass of source substance can be precisely weighed and counted to obtain specific activity.

Two monitors of FIG. 1 design containing sulfur have been tested in the United States Atomic Energy Commission Experimental Breeder Reactor II at Idaho Falls. The monitors were positioned in the outlet coolant (sodium) flow of an irradiation experiment in the reactor core for a power run of approximately 25 days. They were then cooled by maintaining them in the reactor containment at about 370° C. for a day or so prior to further cooling to room temperature and measuring the amount of condensed substance. The maximum coolant temperatures read by the monitors were 415° and 418° C. For comparison, the calculated coolant outlet temperature for this particular experiment in a previous power run was 410° C.

It can be seen that the present invention provides a passive temperature monitor that can be placed in an inaccessible location, such as within a nuclear reactor coolant flow, for determining the maximum temperature occurrence. The device is uncomplicated and can be easily fabricated from inexpensive materials. It can provide accurate temperature monitoring in locations that have previously been most difficult to instrumentate.

The embodiments of the invention in which an exclusive property or privilege is claimed are defined as follows:

1. A device for determining maximum temperature occurrence comprising a sealed vessel including first and second chambers, said second chamber having a restricted opening communicating with said first chamber; a source substance disposed within said first chamber, said source substance capable of exerting substantial vapor pressure at said maximum temperature; heat transfer means for conducting heat to said first chamber to increase the vapor pressure of said source substance and for subsequently conducting heat from said second chamber to condense a portion of said substance within said second chamber; and access means for segregating said portion of substance within said second chamber from said substance within said first chamber in order to quantitate said condensed portion within said second chamber and thereby determine maximum temperature occurrence.

2. The device of claim 1 wherein said second chamber is defined by a second vessel disposed within said first chamber and said restricted opening faces away from said source substance within said first chamber.

3. The device of claim 2 wherein said first and second vessels define substantially evacuated chambers except for said source substance.

4. The device of claim 2 wherein said heat transfer means comprises the walls of said first and second vessels along with a fibrous mass intermediate said walls.

5. The device of claim 1 wherein said source substance is selected from the group consisting of sulfur, zinc, cadmium and selenium.

6. The device of claim 1 wherein said second vessel is composed of frangible material to permit fragmentation for exposure of said condensed portion of substance.

7. The device of claim 1 wherein said source substance has a heat of vaporization less than 30 Kg-Cal/g-atom.

8. The device of claim 1 wherein a tubular valve member having a central plug portion of increased diameter is positioned within said restricted opening with the periphery of said plug portion sealingly communicating with the inside walls of said second chamber to block passage of said condensed portion of substance, the ends of said tubular valve member extending into said first and second chambers for vapor flow therebetween.

9. A method of determining maximum temperature occurrence of a process through use of first and second chambers interconnected by a restricted passageway, comprising disposing a source substance capable of exerting a substantial vapor pressure at said maximum temperature within said first chamber; evacuating air from said chambers; placing said chambers in heat-transfer communication with said process to vaporize a portion of said substance; said vaporized substance permeating through both of said chambers; removing said chambers from communication with said process and cooling to condense said vaporized substance within said chambers; and quantitating the amount of said substance condensed in said second chamber to determine maximum temperature occurrence.

10. The method of claim 9 wherein said source substance is initially disposed within said first chamber and said chambers are evacuated at a temperature substantially below the maximum temperature occurrence of said process.

11. The method of claim 9 wherein the cooling of said first and second chambers is performed at sufficient rates to prevent substantial temperature differences therebetween after said maximum temperature occurrence.

12. The method of claim 9 wherein the amount of said substance condensed within said second chamber is quantitized by separating said second chamber from said first chamber, washing the outer walls of said second chamber, fragmenting said second chamber walls, dissolving said substance condensed in said second chamber with acid solution and determining the amount of said substance in solution by atomic-absorption spectroscopy.

* * * * *